United States Patent
Sauerland et al.

(10) Patent No.: US 6,945,083 B2
(45) Date of Patent: Sep. 20, 2005

(54) METHOD OF AND APPARATUS FOR DETERMINING THE ECCENTRICITY OF A HOLLOW BILLET

(75) Inventors: Martin Sauerland, Mönchengladbach (DE); Karl Heinz Häusler, Korschenbroich (DE)

(73) Assignee: SMS Meer GmbH, Monchengladbach (DE)

( * ) Notice: Subject to any disclaimer, the term of this patent is extended or adjusted under 35 U.S.C. 154(b) by 90 days.

(21) Appl. No.: 10/453,917

(22) Filed: Jun. 3, 2003

(65) Prior Publication Data

US 2004/0003637 A1 Jan. 8, 2004

(30) Foreign Application Priority Data

Jun. 4, 2002 (DE) .......................................... 102 24 635

(51) Int. Cl.[7] ............................................... B21B 37/00
(52) U.S. Cl. .............................. 72/9.2; 72/9.4; 72/11.8; 72/31.06; 72/37; 73/622
(58) Field of Search ............................. 72/8.9, 9.2, 9.4, 72/11.6, 11.8, 12.7, 31.06, 37; 73/622, 625, 628, 655; 356/445

(56) References Cited

U.S. PATENT DOCUMENTS

| | | | | |
|---|---|---|---|---|
| 3,732,726 A | * | 5/1973 | Ferber ......................... 73/601 |
| 4,099,418 A | * | 7/1978 | Bennett et al. ................ 73/622 |
| 4,196,607 A | * | 4/1980 | Youtsey et al. ............ 72/31.06 |
| 4,217,782 A | * | 8/1980 | Pont ............................. 73/637 |
| 4,715,204 A | * | 12/1987 | Ottlik, deceased ............. 72/76 |
| 4,758,398 A | * | 7/1988 | Sparapany et al. ......... 264/151 |
| 5,218,868 A | * | 6/1993 | Yamazaki et al. ............ 73/622 |
| 5,270,942 A | | 12/1993 | Reed |

FOREIGN PATENT DOCUMENTS

| | | |
|---|---|---|
| EP | 0940193 | 9/1999 |
| EP | 0 955 149 | 11/1999 |
| EP | 1102033 A2 | 5/2001 |
| FR | 2530804 | 1/1984 |

\* cited by examiner

*Primary Examiner*—Ed Tolan
(74) *Attorney, Agent, or Firm*—Herbert Dubno

(57) ABSTRACT

The eccentricity of a hollow billet is measured at the outlet of an inclined-roll rolling mill by launching an ultrasonic pulse into the billet from a laser of a measuring device and measuring the transit time of an echo pulse also utilizing a laser and an optical analyzer. The measuring device is moved, during travel of the hollow billet along a path from the rolling mill linearly into the direction of travel or angularly around the hollow billet to eliminate the effect of the internal helical formation of the eccentricity on the measurements. The wall thickness measurements are evaluated by a computer and subjected to Fourier analysis.

19 Claims, 3 Drawing Sheets

METHOD OF AND APPARATUS FOR DETERMINING THE ECCENTRICITY OF A HOLLOW BILLET

FIELD OF THE INVENTION

Our present invention relates to a method of and to an apparatus for determining the eccentricity of a hollow billet prior to, during, or following the passage of the hollow billet through a rolling mill and in which the hollow billet is moved translationally, i.e. linearly, in the direction of its longitudinal axis. More particularly, the invention relates to the measurement of the eccentricity of a hollow billet using a measurement of the wall thickness of the hollow billet during movement of the hollow billet relative to a wall thickness measuring unit.

BACKGROUND OF THE INVENTION

Pipes and tubing of steel can be made by rolling a cylindrical steel blank between the rolls of an inclined-roll mill while piercing the workpiece with an axially stationary piercing mandrel to form a hollow billet. The hollow billet may be further rolled and the result is a seamless pipe or tubing having an internal bore which can be generally of cylindrical configuration and an external peripheral which is likewise generally cylindrical. The process can be that of EP 0 940 193 A2 for example.

The seamless steel billet can be subjected, after piercing, to hot rolling in a succession of rolling mills, the rolling process involving, for example, stretch reduction rolling, in which the diameter of the pipe is reduced and the length thereof increased, reducing rolling and dimensioning rolling. The rolling mills are arranged in a rolling line one after the other and the pipe or tubing thus passes through a succession of mill frames and multiple rolls in each frame engaging the hollow billet.

In each rolling mill stand, there may be a plurality of rolls which contact the hollow billet over respective peripheral segments and in most mill stands of this type of rolling lines, at least three rolls are provided and the result from stand to stand is that the entire periphery of the hollow billet will eventually be contacted by such rolls and a pipe of a reduced diameter determined by the roll and an exact shape, usually an exact cylindrical shape will be obtained.

The pipe produced in this manner should have following the rolling an ideal shape with a cylindrical outer contour and a cylindrical inner contour and such that the inner bore should be as coaxial as possible to the outer periphery. Ideally, therefore, in a section through the pipe, the inner periphery and the outer periphery should form two concentric circles.

Because of the manner in which the pipe is formed, in practice there is always some deviation from perfect concentricity within the permissible fabrication tolerances and as a result a certain permissible eccentricity of the circular contour of the inner periphery relative to that of the outer periphery. The quality parameter in pipe manufacture is thus this eccentricity and since the measure of the eccentricity is a measure of the variation in the pipe wall thickness, during the production process wall thickness measurements are made and monitored. To determine the wall thickness of the pipe, ultrasonic measurement techniques are generally used. The ultrasonic thickness measurement can use a pulse echo method whereby the transit time of an ultrasonic pulse through the thickness of the pipe at a certain location gives the wall thickness.

To determine the eccentricity of a hollow billet, i.e. the product during rolling and before the finished state, i.e. the semifinished product, measurements are required in part to control the process. Indeed, apart from the wall thickness measurement as a quality criterium of the pipe, the eccentricity parameter of the semifinished product is an important further quality indicating parameter.

To obtain a measurement of this parameter as early as possible in the production process, a wall thickness measuring unit can be provided at the outlet of an inclined roll mill. This arrangement allows relatively inexpensively a determination of wall thickness just as the hollow billet emerges from this mill. However, since the hollow billet is rotating at the outlet of the inclined roll mill, a number of wall thickness measurement points can be determined over the periphery of the hollow billet enabling a determination of the eccentricity.

The measured eccentricity of course is the offset of the outer diameter of the hollow billet relative to the inner diameter of its bore. With the standard measurement device as described, however, there is an assumption that this offset is constant over the length of the hollow billet or along the longitudinal coordinate. In practice, however, it is found that the eccentricity varies in the direction of the longitudinal coordinate and indeed has a course which corresponds generally to a helix running along the length of the hollow billet.

This helical course of the eccentricity is a consequence of the rolling of the hollow billet in the inclined roll mill, and the shape of that eccentricity pattern is similar to the shape of a corkscrew. The eccentricity pattern determines a so-called main internal thread whose pitch or twist length is given by the angle of inclination of the rolls of the inclined-roll mill. The eccentricity helix repeats itself periodically at the twist length or pitch. Further eccentricities with greater pitch or lower frequency can be superimposed thereon, for example, as a result of nonuniformity of the heating of the billet in a rotary hearth furnace.

The measurement of the course of the eccentricity over the length coordinate of the hollow billet and thus a determination of the inner surface pattern relative to the outer surface pattern along the length of the hollow billet causes a problem on the following ground:

The main eccentricity, i.e. the main inner thread, whose pitch is given by the advance angle of the inclined roll mill is identical to the measurement spiral. The measurement spiral is understood to be the pattern of the thickness measuring point with which the thickness measurement device scans the hollow billet. Since normally the thickness measuring device is located at a fixed point along the path of the hollow billet and mandrels, the wall thickness of the point of the hollow billet juxtaposed with the thickness-measuring device, because the hollow billet upon emergence from the inclined roll mill both rotates and moves longitudinally past the measurement point, the measurement point describes a spiral in space along the hollow billet. The latter is the measurement spiral along which the wall thickness measurements are taken.

Because of the identity of the loop length of the main internal thread with the pitch of the measurement spiral, it is not possible to obtain, with such a wall thickness measurement device, a determination of the spiral pattern of the eccentricity along the length coordinate itself. An important aspect of the eccentricity of the hollow billet cannot be determined and it is not possible to draw conclusions as to the spatial distribution of the eccentricity in regions other than the region of the measurement spiral. Such information is required for a true evaluation of the quality of the product and in many cases for adequate control of the rolling process.

OBJECT OF THE INVENTION

It is therefore the object of the invention to propose a method and an apparatus for carrying out the method whereby it is for example possible to determine the eccentricity of the hollow billet over its spatial extent along the longitudinal coordinate of the hollow billet and especially obtain a measure for the eccentricity which can be evaluated in a sensible manner in practice.

SUMMARY OF THE INVENTION

From the method point of view, the invention is characterized in that the measurement device is displaced during the measurement in the direction of the longitudinal axis and/or in the circumferential direction of the hollow billet whereby during the movement of a number of wall thickness measurements are undertaken.

The measurement device thus does not remain stationary for the measurements but rather is moved relative to the rolled product and relative to the path of the rolled product. The method of the invention, therefore, can comprise the steps of:

(a) displacing the hollow billet in translation in a direction along a transport path of the hollow billet and along a longitudinal axis of the hollow billet;

(b) juxtaposing with the hollow billet a measuring device capable of measuring a wall thickness of the hollow billet, thereby taking a plurality of wall thickness measurements of the hollow billet over a time interval;

(c) during the time interval displacing the measuring device relative to the path; and (d) calculating eccentricity of the hollow billet from the measurements.

The eccentricity of the hollow billet is preferably determined in the region of the outlet of a rolling mill, especially an inclined-roll mill. Precisely in the case of an inclined roll mill it is the rolled product rotating about its longitudinal axis upstream of the rolling mill during passage through the rolling mill or subsequent to passage through the rolling mill and especially at its outlet from the rolling mill.

Advantageously, the movement of the measuring device is cyclically repeated.

Preferably the measuring device is moved during the measurement in the direction of the longitudinal axis, i.e. along the longitudinal axis and the longitudinal coordinate with the speed of the hollow billet, especially the outlet speed of the hollow billet from the rolling mill.

To acquire a sufficient data quantity, preferably in the case of exclusively a movement of the measuring device along the longitudinal axis, the measuring device may also be provided with a lifting movement which corresponds to at least half pitch, preferably at least a full pitch, of the eccentricity of the hollow billet (thus the pitch of the main internal thread). Correspondingly with exclusive movement of the measuring device in the circumferential direction of the hollow billet, the measuring device can have an arcuate or pivotal oscillation which corresponds to at least 180°.

The measured data of the wall thickness according to the invention is processed in a way which has special significance to the invention. It has been found to be especially advantageous to approximate the course of the eccentricity in terms of the course of the wall thickness as a function of the longitudinal coordinate extending in the direction of the longitudinal axis of the hollow billet and the rotation angle about the longitudinal coordinate in accordance with the relationship $$S(\phi,z)=s_0(z)+s_1(z)\cos(\phi+\delta(z)),$$

In which $s_0$ is the mean wall thickness of the hollow billet, $s_1$ is the mean wall thickness $s_0$ superimposed on the wall thickness amplitude and $\delta$ is the angular position of the circumferentially varying eccentricity as a function of the longitudinal coordinate z.

The measured values as the hollow billet passes the measuring device are supplied to a computer which can subject the measurement to a Fourier analysis and thus derive an approximation of the wall thickness pattern as a function of the longitudinal coordinate and the rotary angle of the form $$S(\phi,z) \approx s_0^* + \Sigma s_{i,1}\cos(\phi+2\pi/p_i z+\xi_{i,1})$$

in which $s_0^*$ and $s_{i,1}$ are the determining Fourier coefficients in the thickness of the hollow billet by a summation (i) over the number (n) of the elements of the Fourier series and $p_i$ and $\xi_{i,1}$ represent the Fourier coefficients for the pitch and for the starting position angle from summation (i) over the number (n) of the Fourier series elements, the frequency transformation being a consideration of the movement of the measuring head.

A device for determining the eccentricity of the hollow billet before, during or subsequent to passage thereof through a rolling mill whereby the hollow billet is moved linearly in the direction of its longitudinal axis and along the longitudinal coordinate, can comprise at least one measuring unit or head which can determine the wall thickness of the hollow billet at a longitudinal and circumferential position of the latter. According to the invention the measuring head is provided with an element which can displace the measuring head during the measurement in the direction of the longitudinal axis and/or in a circumferential direction around the hollow billet.

The measuring device is preferably located at the outlet of a rolling mill, especially an inclined-roll mill.

Advantageously the element for moving the measuring head has a linear guide and a carriage displaceable thereon along the path of the hollow billet.

The movement element can likewise be provided with a carriage which can displace the measurement head along an arcuate guide around at least a portion of the periphery of the hollow billet.

More than one measurement device can be provided and each measuring device or head may have its own element for displacing it relative to the path of the hollow billet or workpiece or a plurality of such measuring heads can be provided on a common movement element.

For efficient determination of the wall thickness of the hollow billet it has been found advantageous to provide a means for launching an ultrasonic signal into the surface of the hollow billet and of course for evaluating the echo signal which results from passage of the ultrasonic signal through the thickness of the hollow billet. The means for launching the ultrasonic signal can be a laser, especially a flash lamp pumped Nd:YAG laser. A computer can be provided as the means for measuring the time interval between the signal and the echo or between two echo signals to enable determination of the wall thickness from knowledge of the speed of sound in the material of the hollow billet. The echo signal evaluation device can also include a laser, especially a diode pumped Nd:YAG laser and an optical analyzer, especially a Fabry-Perot interferometer.

With the method and apparatus of the invention it is possible in a very simple manner to obtain a picture of the spatial pattern of the eccentricity over the longitudinal coordinate of the hollow billet without the danger that the result will be influenced by the limitation of the measurement of a particular spiral pattern. The magnitude and location of the eccentricity can thus provide a more useful indication than earlier measurements. The approximation resulting from the present invention provides a much better criterium for the quality of a hollow billet than earlier measurements and approximations and the method of obtaining the more accurate picture of the eccentricity is simpler than earlier methods.

BRIEF DESCRIPTION OF THE DRAWING

The above and other objects, features, and advantages will become more readily apparent from the following description, reference being made to the accompanying drawing in which.

SPECIFIC DESCRIPTION

Figure 3:
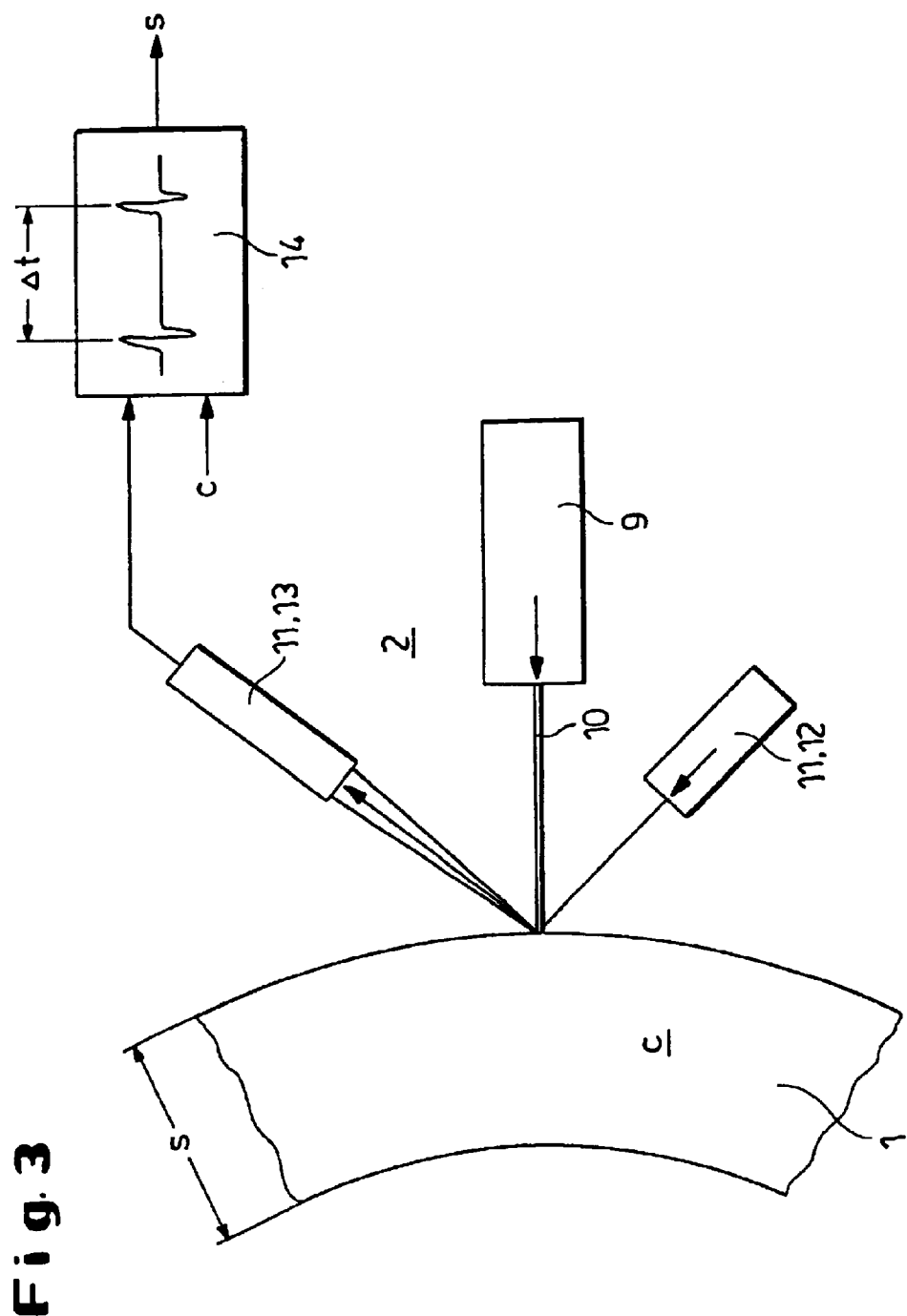
FIG. 3 is a diagram showing the principle of wall thickness measurement as used in the systems of FIG. 1 or 2, in those cases to determine the eccentricity.

Referring first to FIG. 3, in which the use of the ultrasonic pulse echo or transit time method is diagrammed for determining the wall thickness of a hollow billet, especially a hollow billet which has its internal bore formed by a roll-piercing method with a mandrel and inclined roll as described, for example, in EP 0 940 193 A2, it can be seen that the thickness measuring unit determines the transit time $2s$ for an ultrasonic pulse which is launched into the wall thickness of the hollow billet and is reflected back through that wall thickness to determine the wall thickness s. It is assumed that the speed of sound c in the material of the wall is known.

In FIG. 3, the hollow billet is shown at 1 and may be composed of steel. The hollow billet may be at an elevated temperature from the piercing process and in the rolling process, namely, temperatures of around 1000° C. so that the determination of the wall thickness must be made in a contactless manner, that means that both the launching of the ultrasonic pulse into the material and the detection of the reflected pulse are carried out in a contactless manner, e.g. utilizing optical methods from a measuring head or measuring heads at an optically safe distance from the hot hollow billet.

High energy light pulses in the infrared range are absorbed at the surface of the hollow billet 1. Such light pulses are generated from an Nd:YAG laser 9 which is pumped by a discharge lamp (pumped laser) in a conventional manner. The laser pulse which thus is produced can have a wavelength of 1064 nm and a pulse duration of less than 10 ns. The pulses converted at the surface of the hollow billet 1 upon which the laser beam 10 impinges into an ultrasonic signal which is transmitted through the wall of the hollow billet and is reflected back from the internal surface delimiting the bore of the hollow billet. The transduction between the laser beam and the ultrasonic pulse is effected by the brief and explosive ablation of a thin layer of the surface where the high energy laser beam pulse 10 impinges upon the surface. The explosive evaporation of the material at the impingement point utilizes part of the laser beam energy while the rest is absorbed at the surface.

The reflected ultrasonic signal, i.e. the echo, is detected at the surface of the hollow billet.

The reflected ultrasonic pulse or echo produces at the outer surface of the hollow billet 1 oscillations in a subminiature range which is detected by means of a second laser 12 (detection laser) also in a contactless manner. This laser 12 can be a continuous wavelaser (cw laser), a frequency-doubled diode pumped Nd:YAG laser, operating with a wavelength of 532 nm and trained on the point of impingement of the laser beam 10 but at an angle thereto as shown in FIG. 3. The ultrasonic oscillation which is of a much lower frequency than the laser frequency from the cw laser 12, effects a frequency modulation of the detection laser light reflected at the impingement point.

The reflected light cone which is now the carrier of the modulating ultrasonic signal, is collected by an intensity amplifying collecting lens and via an optical waveguide is delivered to an optical analyzer 13, for example a demodulator which can be, especially, a confocal Fabry-Perot interferometer. The output signal of this interferometer superimposed on the analyzer 14 in FIG. 3 thus is the ultrasonic echo sequence in which the interval $\Delta t$ as measured is twice the transit time of sound through the wall thickness. The reference numeral 11 has been used to indicate the means for detecting the transmit time interval $\Delta t$ and is comprised of the laser 12 and the optical analyzer 13.

Further amplification, filtering and signal processing for the ultrasonic echo sequence can be effected with the unit 12 which can be a conventional ultrasonic signal analyzer or computer capable of calculating $\Delta t$ and determining the thickness s from the measured time interval where $s=(c \times \Delta t)/2$. The output of the unit 14 is thus the wall thickness s directly (FIG. 3).

Figure 1:
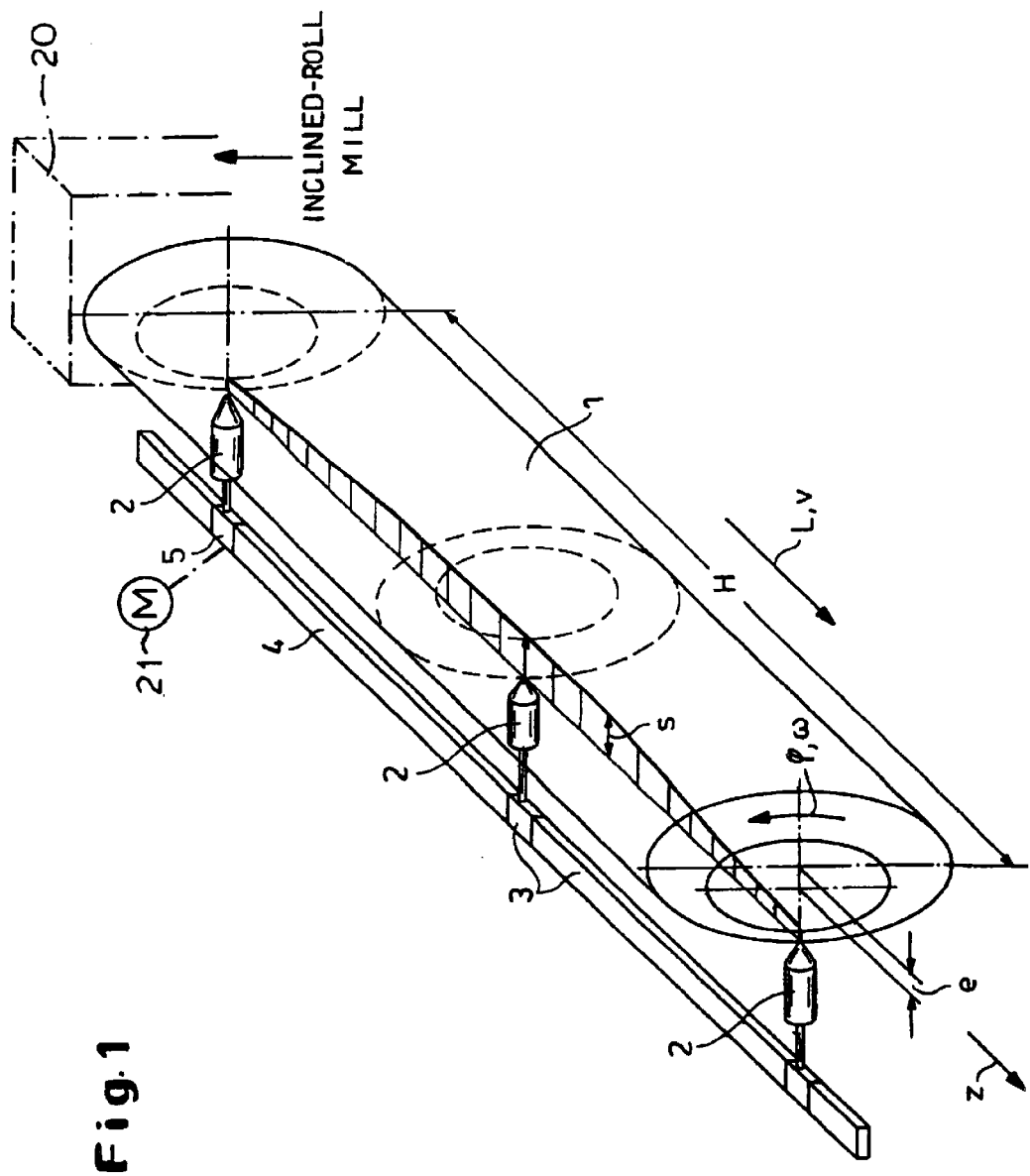
FIG. 1 is a diagrammatic perspective view illustrating the measurement of the eccentricity of a hollow billet following rolling or during a rolling process.

FIG. 1 shows how the eccentricity e of the hollow billet 1 is determined as a function of the length coordinate z of the hollow billet. The hollow billet 1 is assumed to emerge from an inclined roll mill following the piercing and formation of the internal bore and with a rotation represented by the angular velocity $\omega$. Since the hollow billet 1 emerges along the longitudinal axis L with an outlet speed v, a stationary measuring unit 2 of the type shown in FIG. 3 for determining the wall thickness s of the hollow billet scans the hollow billet in a spiral pattern along the longitudinal coordinate z.

Because of the rolling process in the inclined roll mill, the eccentricity e also assumes a generally helical pattern not unlike the configuration of a corkscrew in the direction of the longitudinal coordinate z. In the illustration of FIG. 1, three sections have been shown at three positions along the billet represented for example by respective measuring heads 2 although in practice, only one measurement unit is required as the hollow billet is moved past this head. The wall thickness s is assumed to have a period with a twist length H and to progressively change to the end of that twist length.

A problem with the system as described, wherein the head 2 is truly stationary with respect to the path of the hollow billet 1 is that the internal helix, representing the helical pattern of the eccentricity, has a period or helical-turn length or twist length H which is identical with the period of the measurement spiral or helix, i.e. the helix traced on the outer surface of the hollow billet by a stationary measuring head 2 as the hollow billet passes by and rotates at the angular velocity ω.

Thus, to provide a determination of the spatial course of the eccentricity (e) along the length coordinate z of the hollow billet 1, the method of the invention is carried out as follows:

The measurement of the wall thickness is effected with a measuring device head 2, which is disposed on a movable element 3 which enables displacement of the measuring head or device 2 relative to the path of the hollow billet 1, and, of course, to inclined roll mill from which the hollow billet emerges and which has been shown in FIG. 1 only diagrammatically at 20. The movable element 3 can comprise a carriage or slide 5 guided on a rail 4 which is parallel to the longitudinal direction L and to the direction of travel of the hollow billet along its path.

The measuring device is thus traversed along the linear guide 4, e.g. by a reversible motor 21 connected to the carriage 5. From the position shown in FIG. 1 for the thickness measuring head 2 at the extreme right hand side of the apparatus, the head 2 can be displaced by the motor 21 along the z coordinate and parallel to the longitudinal direction L while the wall thickness s is measured and then returned in the opposite direction in a cyclically repetitive process.

The measuring device 2 can thus initially be displaced with a speed v parallel to the path but relative to it and to the inclined roll mill away from the latter and then returned in the opposite direction while the wall thickness measurements taken repetitively along the length of the hollow billet and around the circumference thereof are stored in a memory forming part of the analyzer 14 previously described.

In FIG. 1, apart from the starting position at the right hand end, an intermediate position of the measuring device 2 and a final position at the left hand end have been shown and the thickness measurement has been superimposed at s upon the illustration of the hollow billet.

Figure 2:
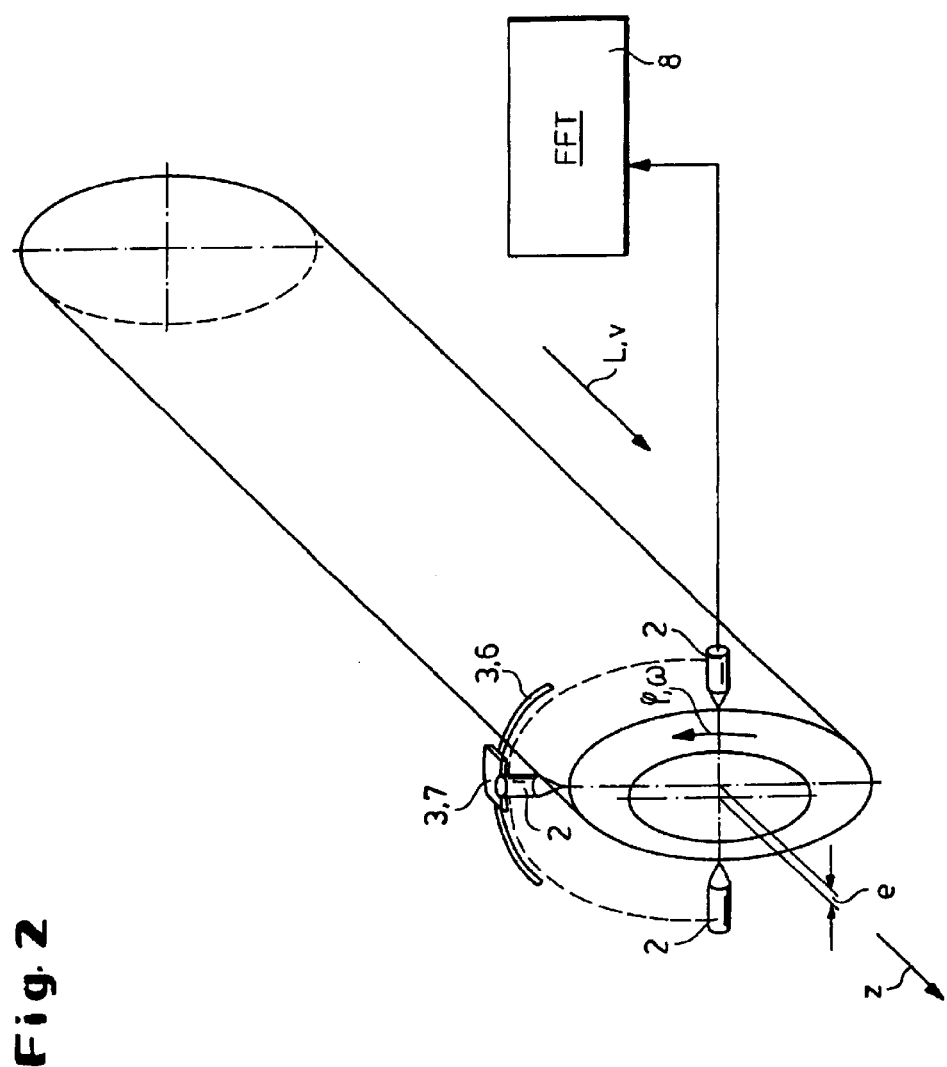
FIG. 2 is a view similar to FIG. 1 showing an alternative system for measurement of the eccentricity.

FIG. 2 shows an alternative embodiment in which the thickness measuring unit 2 is swung back and forth circumferentially with respect to the path and the hollow billet 1. For this purpose, the movement element 3 comprises a carriage 7 displaceable on an arcuate guide 6 and driven back and forth by a motor analogous to the motor 21. FIG. 2 shows that the displacement can take place between a 3 o'clock starting position through a 12 o'clock intermediate position to a 9 o'clock end position. Once the 9 o'clock end position is reached, the measuring device 2 is swung back to the 3 o'clock starting position in a periodically repetitive manner.

The output of the measuring system, including for example, the analyzer 13 can be applied to the computer 14 through a further computer unit which can effect a fast Fourier transformer analysis of the signals from the measuring unit 2 to effectively filter out the effect of the periodicity of the displacement of the thickness measuring unit so that the wall thickness measurements can be stored as a function of the length of the hollow billet and thus the course of the eccentricity determined with precision.

More particularly, to determine the eccentricity relative to the longitudinal coordinate z and thus the course of the eccentricity of the hollow billet 1, the measurements of the wall thickness s are stored during a measurement cycle and evaluated by the computer 8 (FIG. 2). From the Fourier analysis of the measured values of the wall thickness s over the length coordinate z and over the angular position φ (circumferential angle of the hollow billet 1) as a sum of individual harmonic oscillations with different amplitudes and different starting angles, see the formulas given above, the course of the wall thickness is determined. The calculation is represented by the initials FFT in FIG. 2 to represent a standard "Fast Fourier Transformation" analysis. For details reference can be made to "Hütte—Bases of Engineering Science" volume 29, pages B 34 ff. Frequency shifts resulting from the displacement of the measuring head 2 are thus eliminated from the calculation.

An "ideal eccentricity" is calculated from the wall thickness s as a function of the length coordinate z in terms of the eccentricity amplified $s_1(z)$. The distribution of the eccentricity around the circumference is given by the cosine function and can be determined for each angle φ (z). As a mathematical approximation, the wall thickness course can be represented by a mean value of the sums with a helix superimposed thereon and for a fixed angle a conventional Fourier series in "z" is obtained. The starting angle $\phi_{i,1}$ of the longitudinal oscillation is dependent upon the position of the hollow billet during the measurement at the start. If one then alters the angle φ for each longitudinal coordinate, one obtains the complete course of the eccentricity in the hollow billet.

This mode of operation can be summarized as follows: To determine the main eccentricity, namely, the eccentricity of the main internal helix in a hollow billet, the thickness measuring device during the measurement is either oscillated in the longitudinal direction or circumferentially about the hollow billet or both and the superimposition of the oscillating movement on the measurement values are ultimately eliminated by Fourier analysis so that the thickness measurement on the main internal helix can be ascertained. When the measured wall thickness data set is analyzed, the displacement amplitude in the longitudinal direction over half the pitch can be detected by the Fourier analysis and the amplitude of the main helix or spiral determined and a complete cycle can be evaluated.

The data and frequency analysis can be carried out at the constant angular speed and constant advance of the hollow billet so that the scanning to measure the wall thickness is effected at a constant rate and will immediately provide the eccentric oscillation frequency formed by the rolling of the hollow billet. There is, therefore, no frequency shift between the eccentric oscillation frequency and that determined by the measurement. The rotation during the measurement functions to output a frequency which is analogous to that of a frequency shift. The cyclical movement of the measurement head provides similar superimposition frequency which is canceled by the frequency analysis. When one compares this kind of measurement with the measurement, for example, of a press-formed hollow billet in a spiral pattern scanning for eccentricity, the scanning angular frequency is analogous to the frequency of the results obtained with the present invention.

The Fourier analysis of spirally scanned measurement data supplies a result as a difference of the two frequencies, i.e. the relative frequency between the rolling spiral and scanning spiral. At the outlet of the inclined-roll mill, this relative frequency or frequency difference is zero. The zero frequency result is in the frequency range, the average value and is dependent upon the relative starting position (starting phase angle of the main inner helix and is falsified by the fact that an inner helix does exist. For example, if one commences the measurement exactly in the trough of the eccentric spiral, the average value is falsified downwardly while if one takes the measurement initially at a crest, there is a falsification in the result upwardly. The starting position varies randomly from hollow billet to hollow billet depending upon the starting conditions and starting point.

According to the invention the additional movement of the measurement head toward the measurement insures that a relative frequency will be different from zero and thus will compensate for mean value falsification of the type described.

The measured values can be interpreted by conventional interpretation and evaluation methods as are commonly used in communications technology with respect to frequency shifts and modulation.

The measurement of the wall thickness by the ultrasonic measurement process described can also be used if the piercing mandrel remains in the hollow billet.

Furthermore, more than one wall thickness measuring device can be used, in which case the system may be a multichannel system and multiple wall thickness measurements can be made equidistantly around the circumference of the wall below and along the length thereof. In such cases, all of he equispaced wall thickness measuring devices can be moved collectively relative to the path of the hollow billet.

For a sufficiently precise measurement of the eccentricity as a function of the length coordinate z and the angular position $\phi$, it is also important that a sufficiently high scanning frequency be chosen. The minimum scanning frequency can be determined in accordance with the Shannon scanning theorem (see "Hütte—Die Grundlagen der Ingenieurwissenschaften", volume 29, pages H 68 ff). For example, at a 50 Hz scanning rate, the impact frequency of a feed spiral in the hollow billet with a pitch of 40 mm can be determined, when the hollow billet is moved without rotation at a rate of 1 m/s past the measuring head.

It should be noted that in the foregoing "the helix" which was described in the hollow billet was a helical pattern on the inner surface of the hollow billet. The invention can however also be used to measure the effect of a helical pattern on the external surface of the hollow billet.

REFERENCE CHARACTER LIST

| 1 | Hollow billet |
| 2 | Measuring device |
| 3 | Movement element |
| 4 | Linear guide |
| 5 | Carriage |
| 6 | Guide |
| 7 | Carriage |
| 8 | Computer |
| 9 | Means for creating the ultrasonic signal (excitation laser) |
| 10 | Ultrasonic signal |
| 11 | Means for measuring the time interval |
| 12 | Laser |
| 13 | Optical analyzer (Fabry-Perot Interferometer) |
| 14 | Computer |
| e | Eccentricity |
| L | Longitudinal axis |
| s | Wall thickness |
| H | Pitch (twist length) |
| v | Discharge seed |
| $\phi$ | Rotation angle (circumferential direction) |
| $\omega$ | Angular velocity |
| z | Longitudinal coordinate of the hollow billet |

-continued

| $s_0$ | Mean wall thickness of the hollow billet |
| $s_1$ | Superimposed wall thickness amplitude |
| $\delta$ | Position angle |
| n | Principle of Fourier sequence elements |
| $s_0^*$ | Fourier coefficient for the wall thicknesses |
| $s_{i,1}$ | Fourier coefficient for the wall thickness (i = 1, . . . , n) |
| $p_i$ | Fourier coefficient for the pitch (i = 1, . . . , n) |
| $\xi_{i,1}$ | Fourier coefficient for the starting angle (i = 1, . . . , n) |
| $\Delta t$ | Time interval |
| c | Speed of sound |
| FFT | Fast Fourier Transformation |

We claim:

1. A method of measuring eccentricity of a hollow billet in conjunction with a rolling thereof, comprising the steps of:
    (a) displacing said hollow billet in translation in a direction along a transport path of the hollow billet and along a longitudinal axis of the hollow billet;
    (b) juxtaposing with said hollow billet a measuring device capable of measuring a wall thickness of said hollow billet, thereby taking a plurality of wall thickness measurements of said hollow billet over a time interval;
    (c) during said time interval displacing said measuring device relative to said path; and
    (d) calculating eccentricity of the hollow billet from said measurements, the calculation of eccentricity of the hollow billet in step (d) including determining a pattern of a wall thickness (s) of the hollow billet as a function of a longitudinal coordinate (z) in a direction of the longitudinal axis of the hollow billet and an angle $\phi$ around the longitudinal axis in accordance with the relationship $$S(\phi,z)=s_0(z)+s_1(z) \cos (\phi+\delta(z)),$$

where $s_0$ is the mean wall thickness of the hollow billet, $s_1$ is the wall thickness amplitude superimposed on the wall thickness $s_0$ and $\delta$ is the annular position dependent on the longitudinal coordinate (z) of the wall thickness, and subjecting the result to a Fourier transformation to obtain the course of the wall thickness as a function of the longitudinal coordinate (z) and the annular position $\phi$ to an approximation of the form $$S(\phi,z) \approx \xi s_0^* + s_{i,1} \cos(\phi+2\pi/p_i z+\xi_{i,1})$$

wherein $s_0^*$ and $s_{i,1}$ are the determining Fourier coefficients in the thickness of the hollow billet by a summation (i) over the number (n) of the elements of the Fourier series and $p_i$ and $\xi_{i,1}$ represent the Fourier coefficients for the pitch and for the starting position angle from summation (i) over the number (n) of the Fourier series elements, the frequency transformation being a consideration of the movement of the measuring head.

2. The method defined in claim 1 wherein said measurements are taken prior to, during or subsequent to a hot rolling of said hollow billet.

3. The method defined in claim 1 wherein said measuring device is displaced in step (c) along said longitudinal axis.

4. The method defined in claim 1 wherein said measuring device is displaced in step (c) in a direction about a periphery of said hollow billet.

5. The method defined in claim 1 wherein said measuring device is displaced in step (c) along said longitudinal axis and in a direction about a periphery of said hollow billet.

6. The method defined in claim 1 wherein the eccentricity is measured at the outlet of an inclined-roll rolling mill.

7. The method defined in claim 1 wherein the hollow billet is rotated during displacement thereof along said transport path.

8. The method defined in claim 1, further comprising the step of repeating the displacement of said measuring device in step (c) cyclically.

9. The method defined in claim 1 wherein the measuring device is displaced in step (c) in a direction of displacement of the hollow billet along said transport path at a speed equal to an outlet speed of said hollow billet from a rolling mill.

10. The method defined in claim 1 wherein said measuring device is displaced in step (c) exclusively in a direction along the longitudinal axis with a stroke which is at least equal to half a pitch of a helical eccentricity of said hollow billet.

11. The method defined in claim 10 wherein said stroke is at least equal to a full pitch of the helical eccentricity of said hollow billet.

12. The method defined in claim 1 wherein said measuring device is displaced exclusively circumferentially around said hollow billet in step (c) through an angle of at least 180°.

13. An apparatus for determining the eccentricity of a hollow billet prior to, during or subsequent to passage through a rolling mill and wherein the hollow billet is displaced in translation along a transport path in a direction of a longitudinal axis of the hollow billet comprising:
- a measuring device juxtaposed with said hollow billet and capable of measuring a wall thickness thereof;
- a movement element carrying said measuring device for displacing said measuring device relative to said path in said direction or around a circumference of said hollow billet or both in said direction and around said circumference of said hollow billet whereby a plurality of wall thickness measurements are taken at different locations along a length of said hollow billet and around the circumference of said hollow billet; and
- means connected to said measuring device and analyzing said measurements for calculating eccentricity of the hollow billet from said measurements by determining a pattern of a wall thickness (s) of the hollow billet as a function of a longitudinal coordinate (z) in a direction of the longitudinal axis of the hollow billet and an angle $\phi$ around the longitudinal axis in accordance with the relationship $$S(\phi, z) = s_0(z) + s_1(z) \cos(\phi + \delta(z)),$$

where $s_0$ is the mean wall thickness of the hollow billet, $s_1$ is the wall thickness amplitude superimposed on the wall thickness $s_0$ and $\delta$ is the annular position dependent on the longitudinal coordinate (z) of the wall thickness, and subjecting the result to a Fourier transformation to obtain the course of the wall thickness as a function of the longitudinal coordinate (z) and the angular position $\phi$ to an approximation of the form $$S(\phi, z) \approx \xi s_0^* + s_{i,1} \cos(\phi + 2\pi/p_i z + \xi_{i,1})$$

wherein $s_0^*$ and $s_{i,1}$ are the determining Fourier coefficients in the thickness of the hollow billet by a summation (i) over the number (n) of the elements of the Fourier series and $p_i$ and $\xi_{i,1}$ represent the Fourier coefficients for the pitch and for the starting position angle from summation (i) over the number (n) of the Fourier series elements, the frequency transformation being a consideration of the movement of the measuring head.

14. The apparatus defined in claim 13 wherein said device is located at the outlet of an inclined-roll rolling mill.

15. The apparatus defined in claim 14 wherein said movement element includes a carriage carrying said measuring device and displaceable along a linear guide parallel to said path.

16. The apparatus defined in claim 14 wherein said movement element includes a carriage displaceable on an arcuate guide around the circumference of said hollow billet and carrying said measuring device.

17. The apparatus defined in claim 14 wherein said means for calculating the eccentricity includes a computer for carrying out the Fourier transformation for approximating a course of the eccentricity of the hollow billet.

18. The apparatus defined in claim 17 wherein said measuring device includes means for generating an ultrasonic pulse in said hollow billet and comprising a flash lamp pumped Nd:YAG laser.

19. The apparatus defined in claim 18 wherein said measuring device includes a means for measuring a time interval between two ultrasonic echo signals traversing a wall thickness of said hollow billet and including a diode pump Nd:YAG laser and, has an optical analyzer, a Fabry-Perot interferometer.

* * * * *